US012803122B2

(12) United States Patent
Abe et al.

(10) Patent No.: US 12,803,122 B2
(45) Date of Patent: Nov. 17, 2026

(54) BATTERY MODULE

(71) Applicant: PRIME PLANET ENERGY & SOLUTIONS, INC., Tokyo (JP)

(72) Inventors: Kosyo Abe, Himeji (JP); Keiichiro Kobayashi, Nisshin (JP); Takahide Takeda, Himeji (JP); Masaki Koike, Nagoya (JP); Koji Watanabe, Okazaki (JP); Seiichi Sakuramoto, Kobe (JP); Yasushi Tsuchida, Nisshin (JP); Yuzo Suzuki, Kariya (JP); Yasuo Ikeda, Toyota (JP); Makoto Ochi, Myouzai-gun (JP); Kosuke Iwase, Konan (JP); Mio Takeno, Miki (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 896 days.

(21) Appl. No.: 18/051,638

(22) Filed: Nov. 1, 2022

(65) Prior Publication Data

US 2023/0155255 A1 May 18, 2023

(30) Foreign Application Priority Data

Nov. 17, 2021 (JP) ................................ 2021-187143

(51) Int. Cl.
*H01M 50/503* (2021.01)
*H01M 50/209* (2021.01)
(Continued)

(52) U.S. Cl.
CPC ....... *H01M 50/503* (2021.01); *H01M 50/209* (2021.01); *H01M 50/264* (2021.01);
(Continued)

(58) Field of Classification Search
CPC ............ H01M 50/503; H01M 50/209; H01M 50/264; H01M 50/516; H01M 50/517; H01M 2220/20
See application file for complete search history.

(56) References Cited

U.S. PATENT DOCUMENTS

2011/0076521 A1 3/2011 Shimizu et al.
2020/0176747 A1 6/2020 Ogino
(Continued)

FOREIGN PATENT DOCUMENTS

CN 111937184 A 11/2020
CN 112204810 A 1/2021
(Continued)

*Primary Examiner* — Holly Rickman
(74) *Attorney, Agent, or Firm* — Finnegan, Henderson, Farabow, Garrett and Dunner LLP

(57) ABSTRACT

A battery module includes: a plurality of battery cells stacked in a predetermined direction; a restraint member that applies, to the plurality of battery cells, restraint force along the predetermined direction; and a plurality of bus bars that electrically connects the plurality of battery cells together, the plurality of bus bars including a first bus bar and a second bus bar. The first bus bar has a first joining portion that joins separated members to each other by a first joining form, and connects, via the first joining portion, between battery cells adjacent to each other in the predetermined direction. The second bus bar has a second joining portion that joins separated members to each other by a second joining form different from the first joining form, and connects, via the second joining portion, between battery cells adjacent to each other in the predetermined direction.

7 Claims, 9 Drawing Sheets

(51) Int. Cl.
*H01M 50/264* (2021.01)
*H01M 50/516* (2021.01)
*H01M 50/517* (2021.01)

(52) U.S. Cl.
CPC ....... *H01M 50/516* (2021.01); *H01M 50/517* (2021.01); *H01M 2220/20* (2013.01)

(56) References Cited

U.S. PATENT DOCUMENTS

| | | | | |
|---|---|---|---|---|
| 2021/0036296 | A1 | 2/2021 | Nobuhira et al. | |
| 2021/0226304 | A1* | 7/2021 | Suzuki .................. | H01M 50/51 |
| 2021/0384592 | A1 | 12/2021 | Urano et al. | |

FOREIGN PATENT DOCUMENTS

| | | | |
|---|---|---|---|
| CN | 112889180 | A | 6/2021 |
| EP | 03840085 | A1 | 6/2021 |
| EP | 03876305 | A1 | 9/2021 |
| JP | 2012-059451 | A | 3/2012 |
| JP | 2013-073916 | A | 4/2013 |
| JP | 2016-027578 | A | 2/2016 |
| JP | 2016-115458 | A | 6/2016 |
| WO | WO2008/095313 | * | 2/2008 |
| WO | WO 2019/021912 | A1 | 1/2019 |
| WO | WO 2020/035970 | A1 | 2/2020 |
| WO | WO 2020/090492 | A1 | 5/2020 |

* cited by examiner

BATTERY MODULE

This nonprovisional application is based on Japanese Patent Application No. 2021-187143 filed on Nov. 17, 2021, with the Japan Patent Office, the entire contents of which are hereby incorporated by reference.

BACKGROUND OF THE INVENTION

Field of the Invention

The present invention relates to a battery module.

Description of the Background Art

For example, Japanese Patent Laying-Open No. 2013-73916 discloses a battery pack including: a plurality of cells arranged side by side; a case that accommodates the plurality of cells; a spacer disposed between the cells; and a bottom member disposed between the bottom surface of each of the cells and the case, the bottom member being attachable to and detachable from the spacer.

WO 2019/021912 discloses a combined battery pack including: a first battery pack and a second battery pack each having the same structure; and combining means for combining the first battery pack and the second battery pack with each other. Each battery pack has a substantially rectangular parallelepiped shape and includes a plurality of stacked prismatic batteries.

SUMMARY OF THE INVENTION

As disclosed in each of the pieces of the patent literature described above, there has been known a battery module including a plurality of battery cells stacked in one direction, wherein a bus bar is used as means for electrically connecting the plurality of battery cells together.

On the other hand, there are a variety of purposes of use, required performances, and the like with regard to battery modules, so that the number of battery cells included in a battery module is also changed accordingly. In each of such conventional battery modules, however, a situation of adjusting the number of battery cells in connection among the plurality of battery cells through the bus bar has not been taken into consideration.

In view of the above, an object of the present invention is to solve the above-described problem and provide a battery module in which the number of battery cells can be readily adjusted.

A battery module according to the present invention includes: a plurality of battery cells stacked in a predetermined direction; a restraint member that applies, to the plurality of battery cells, restraint force along the predetermined direction; and a plurality of bus bars that electrically connects the plurality of battery cells together, the plurality of bus bars including a first bus bar and a second bus bar. The first bus bar has a first joining portion that joins separated members to each other through a first joining form, and connects, via the first joining portion, between battery cells adjacent to each other in the predetermined direction. The second bus bar has a second joining portion that joins separated members to each other through a second joining form different from the first joining form, and connects, via the second joining portion, between battery cells adjacent to each other in the predetermined direction.

According to the battery module thus configured, the different joining forms are used for the first joining portion of the first bus bar and the second joining portion of the second bus bar, so that joining and disjoining of the separated members by one of the first joining portion and the second joining portion can be performed more readily than joining and disjoining of the separated members by the other of the first joining portion and the second joining portion. Thus, the number of battery cells included in the battery module can be readily adjusted by joining and disjoining the members by one of the first joining portion and the second joining portion so as to connect or disconnect the battery cells adjacent to each other in the predetermined direction.

Preferably, the second joining form is welding.

According to the battery module thus configured, the members can be firmly joined to each other by the second joining portion, thus resulting in improved reliability of the connection between the battery cells by the second bus bar.

Preferably, the first joining form is fixation with a bolt, pin, clip or band.

According to the battery module thus configured, means allowing for attaching to and detaching from the first bus bar is used as the first joining form, with the result that the members can be readily joined to and disjoined from each other by the first joining portion.

Preferably, electric resistance of the first bus bar and electric resistance of the second bus bar are different from each other.

According to the battery module thus configured, energy loss can be suppressed to be small in the bus bar having smaller electric resistance.

Preferably, a body size of the first bus bar and a body size of the second bus bar are different from each other.

According to the battery module thus configured, a wide space can be secured around the bus bar having a smaller body size.

Preferably, the battery module includes a plurality of battery cell units arranged side by side in the predetermined direction and fed with the restraint force along the predetermined direction by the restraint member. Each of the battery cell units has the plurality of battery cells arranged side by side continuously in the predetermined direction, and a holding member that collectively holds the plurality of battery cells arranged side by side continuously in the predetermined direction. The first bus bar electrically connects between the battery cells adjacent to each other in the predetermined direction between a first battery cell unit of the plurality of battery cell units and a second battery cell unit of the plurality of battery cell units, the second battery cell unit being adjacent to the first battery cell unit in the predetermined direction. The second bus bar electrically connects between the battery cells adjacent to each other in the predetermined direction in each of the battery cell units.

According to the battery module thus configured, the number of battery cells included in the battery module can be readily adjusted by connecting the battery cells or disconnecting them by the first bus bar between the first battery cell unit and the second battery cell unit so as to adjust the number of battery cell units.

Preferably, the first bus bar further has a first bus-bar-divided body and a second bus-bar-divided body joined to each other by the first joining portion. The restraint member has an end plate facing, in the predetermined direction, a third battery cell unit of the plurality of battery cell units, the third battery cell unit being disposed at an end portion in the predetermined direction. The battery module further includes a third bus bar provided in the third battery cell unit at a battery cell disposed adjacent to the end plate in the predetermined direction. The third bus bar has the same shape as a shape of one of the first bus-bar-divided body and the second bus-bar-divided body, and is able to be joined to an external terminal using the first joining form.

According to the battery module thus configured, by using the third bus bar having the same shape as the shape of one of the first bus-bar-divided body and the second bus-bar-divided body of the first bus bar, the third battery cell unit included in the battery module can be joined to an external terminal by the first joining form.

Preferably, each of the battery cells has an output density of 8000 W/L or more.

According to the battery module thus configured, the number of battery cells can be readily adjusted in a battery module including battery cells each having a high output density of 8000 W/L or more.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
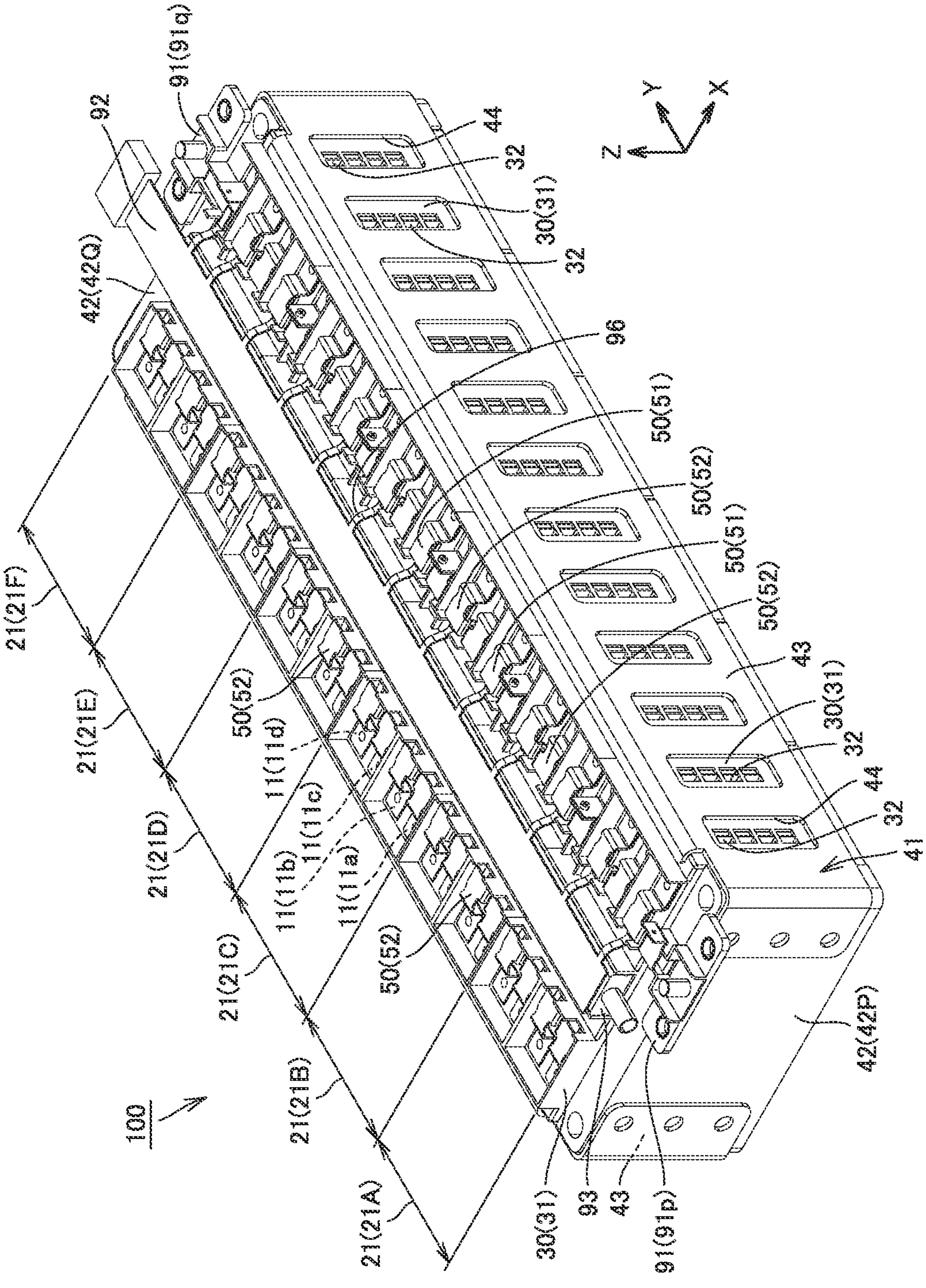
FIG. 1 is a perspective view showing a battery module according to an embodiment of the present invention.

Embodiments of the present invention will be described with reference to figures. It should be noted that in the figures referred to below, the same or corresponding members are denoted by the same reference characters.

Figure 2:
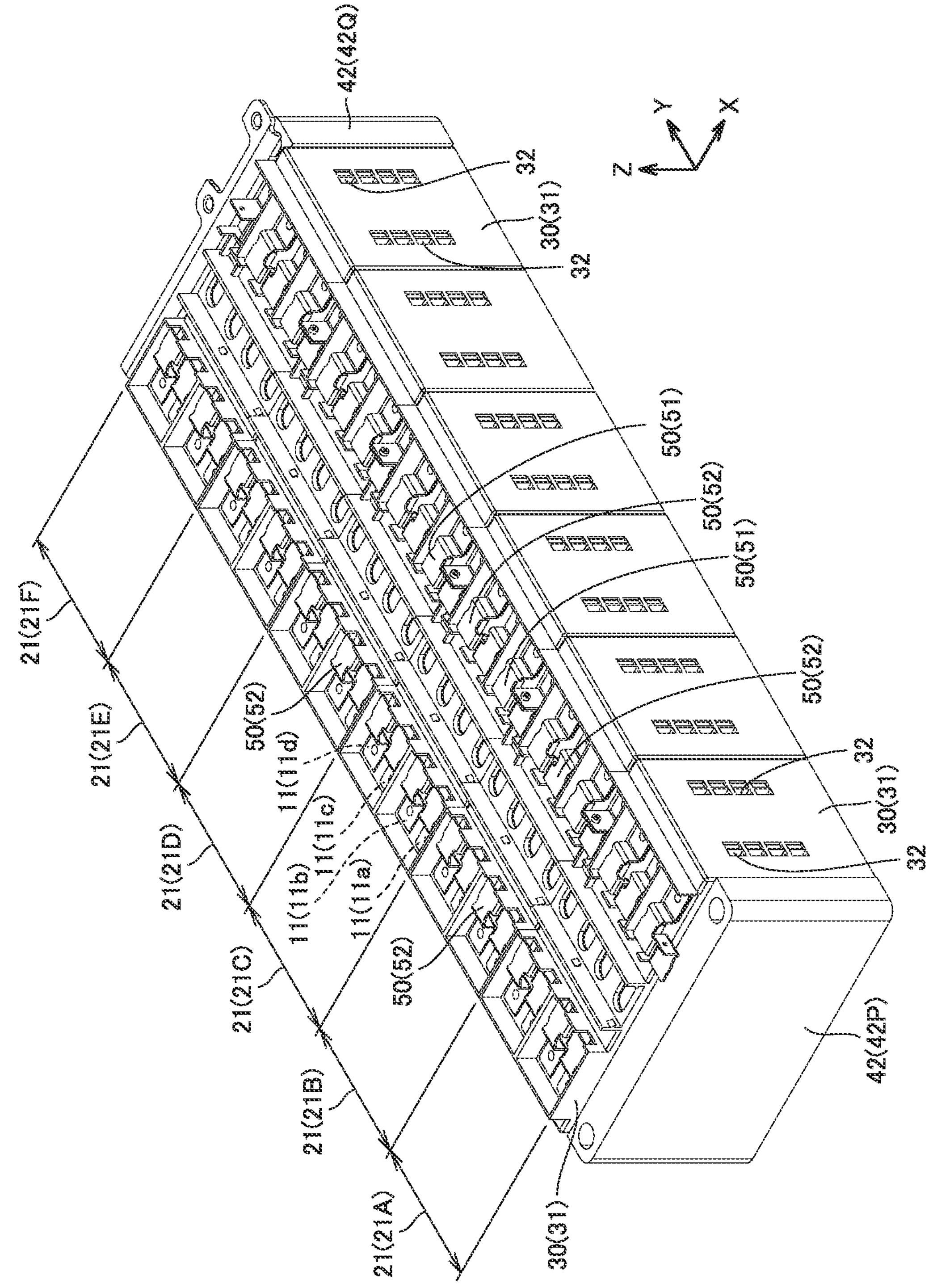
FIG. 2 is a perspective view showing an internal structure of the battery module in FIG. 1.
Figure 3:
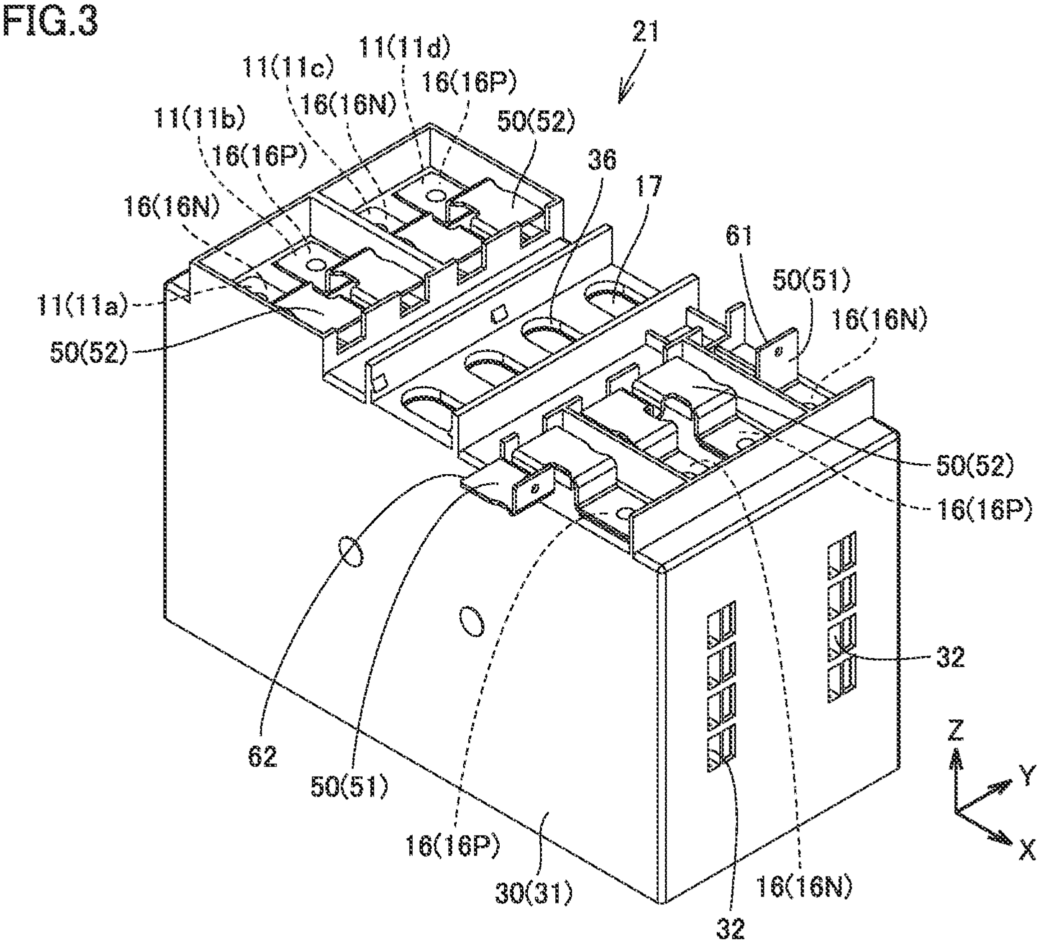
FIG. 3 is a perspective view showing a battery cell unit included in the battery module in FIG. 1.

FIG. 1 is a perspective view showing a battery module according to an embodiment of the present invention. FIG. 2 is a perspective view showing an internal structure of the battery module in FIG. 1. FIG. 3 is a perspective view showing a battery cell unit included in the battery module in FIG. 1.

Referring to FIGS. 1 to 3, a battery module 100 is used as a power supply for driving a vehicle such as a hybrid electric vehicle (HEV), a plug-in hybrid electric vehicle (PHEV), or a battery electric vehicle (BEV).

In the present specification, for convenience of description of the structure of battery module 100, the "Y axis" represents an axis extending in parallel with a stacking direction of a plurality of below-described battery cells 11, the "X axis" represents an axis extending in a direction orthogonal to the Y axis, and the "Z axis" represents an axis extending in a direction orthogonal to the Y axis and the X axis. An obliquely rightward upward direction in the plane of sheet of FIG. 1 is "+Y axis direction", and an obliquely leftward downward direction in the plane of sheet of FIG. 1 is "−Y axis direction". An obliquely rightward downward direction in the plane of sheet of FIG. 1 is "+X axis direction" and an obliquely leftward upward direction in the plane of sheet of FIG. 1 is "−X axis direction". An upward direction in the plane of sheet of FIG. 1 is "+Z axis direction" and a downward direction in the plane of sheet of FIG. 1 is "−Z axis direction".

Typically, battery module 100 is mounted on a vehicle in such a posture that the +Z axis direction corresponds to the upward direction and the −Z axis direction corresponds to the downward direction.

First, an overall structure of battery module 100 will be described. As shown in FIG. 1, battery module 100 includes a plurality of battery cell units 21 (21A, 21B, 21C, 21D, 21E, 21F) and a restraint member 41. The plurality of battery cell units 21 are stacked in the Y axis direction.

Battery cell unit 21A, battery cell unit 21B, battery cell unit 21C, battery cell unit 21D, battery cell unit 21E, and battery cell unit 21F are arranged side by side in this order from the negative side to the positive side in the Y axis direction. It should be noted that the number of battery cell units 21 included in battery module 100 is not particularly limited as long as two or more battery cell units 21 are included.

The plurality of battery cell units 21 are collectively held by restraint member 41. Restraint member 41 applies, to the plurality of battery cell units 21, restraint force along the Y axis direction. Restraint member 41 has a pair of end plates 42 (42P, 42Q), a pair of first restraint bands 43, and a second restraint band (not shown).

The pair of end plates 42 are disposed on both sides beside the plurality of battery cell units 21 stacked in the Y axis direction. End plate 42P is disposed to face battery cell unit 21A in the Y axis direction. End plate 42Q is disposed to face battery cell unit 21F in the Y axis direction. Each of end plates 42 is composed of a plate material having a thickness direction corresponding to the Y axis direction.

The pair of first restraint bands 43 are disposed on both sides beside the plurality of battery cell units 21 in the X axis direction. The second restraint band (not shown) is provided at a position facing the plurality of battery cell units 21 in the Z axis direction. Each of first restraint bands 43 and the second restraint band extends in the Y axis direction. An end portion of each of first restraint bands 43 and the second restraint band in the −Y axis direction is connected to end plate 42P. An end portion of each of first restraint bands 43 and the second restraint band in the 1Y axis direction is connected to end plate 42Q.

Each of first restraint bands 43 is provided with a plurality of openings 44.

The plurality of openings 44 are provided at intervals in the Y axis direction, and each of openings 44 is constituted of a through hole extending through first restraint band 43 in the X axis direction. Opening 44 is provided to expose ventilation ports 32 provided in a case body 31 described later.

Battery module 100 further has a pair of collective terminals 91 (91*p*, 91*q*), a wiring member 92, a plurality of voltage detection wires 96, and an exhaust duct 93.

The pair of collective terminals 91 are disposed on both sides beside the plurality of battery cell units 21 stacked in the Y axis direction. Collective terminal 91*p* is provided at a position overlapping with end plate 42P when viewed in the Z axis direction. Collective terminal 91*q* is provided at a position overlapping with end plate 42Q when viewed in the Z axis direction. Each of collective terminals 91 is a terminal for connecting battery module 100 to an external wiring such as a cable disposed outside battery module 100.

Wiring member 92 is provided at a position facing the plurality of battery cell units 21 in the Z axis direction. Wiring member 92 is disposed opposite to the second restraint band (not shown) with the plurality of battery cell units 21 being interposed therebetween. Wiring member 92 extends, in the Y axis direction, through the central portions of battery cell units 21 in the X axis direction. Wiring member 92 is composed of, for example, a flexible printed circuit board. The plurality of voltage detection wires 96 extend from wiring member 92 and are respectively connected to a plurality of below-described bus bars 50.

Exhaust duct 93 extends in the Y axis direction. Exhaust duct 93 extends at a position overlapping with wiring member 92 when viewed in the Z axis direction. Exhaust duct 93 is disposed between each of the plurality of battery cell units 21 and wiring member 92 in the Z axis direction.

As shown in FIGS. 2 and 3, each of battery cell units 21 has a plurality of battery cells 11 and a holding member 30.

Battery cell unit 21 has four battery cells 11 (11*a*, 11*b*, 11*c*, 11*d*). Battery cell unit 21 has an even number of battery cells 11. It should be noted that the number of battery cells 11 included in each battery cell unit 21 is not particularly limited as long as two or more battery cells 11 are included. An odd number of battery cells 11 may be included.

In each battery cell unit 21, i.e., in each of battery cell unit 21A, battery cell unit 21B, battery cell unit 21C, battery cell unit 21D, battery cell unit 21E, and battery cell unit 21F, the plurality of battery cells 11 are arranged side by side continuously in the Y axis direction. Battery cell 11*a*, battery cell 11*b*, battery cell 11*c*, and battery cell 11*d* are arranged side by side in this order from the negative side to the positive side in the Y axis direction.

The stacking direction of the plurality of battery cells 11 in each battery cell unit 21 is the same as the stacking direction of the plurality of battery cell units 21. Restraint member 41 applies, to the plurality of battery cells 11, restraint force along the Y axis direction.

Holding member 30 collectively holds the plurality of battery cells 11 (11*a*, 11*b*, 11*c*, 11*d*). Holding member 30 includes case body 31. Case body 31 has an external appearance having a rectangular parallelepiped shape. The plurality of battery cells 11 are accommodated in case body 31.

Case body 31 is provided with the plurality of ventilation ports 32. The plurality of ventilation ports 32 are provided in the both side surfaces of case body 31 orthogonal to the X axis direction. Each of ventilation ports 32 is constituted of a through hole extending through case body 31 in the X axis direction. Ventilation port 32 is provided as a path for introducing cooling air into a space between battery cells 11 adjacent to each other in the Y axis direction and discharging the cooling air from the space.

Figure 4:
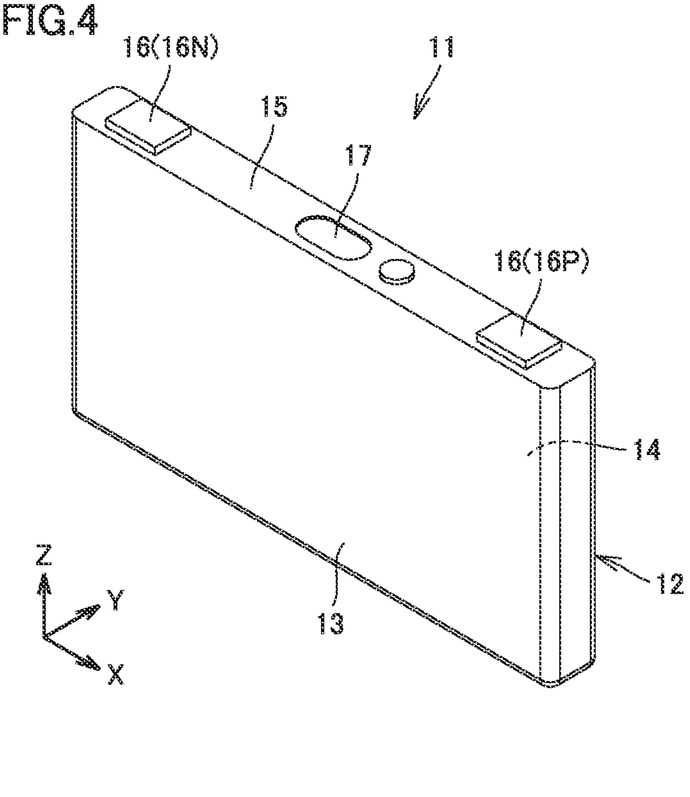
FIG. 4 is a perspective view showing a battery cell included in the battery cell unit in FIG. 3.
Figure 5:
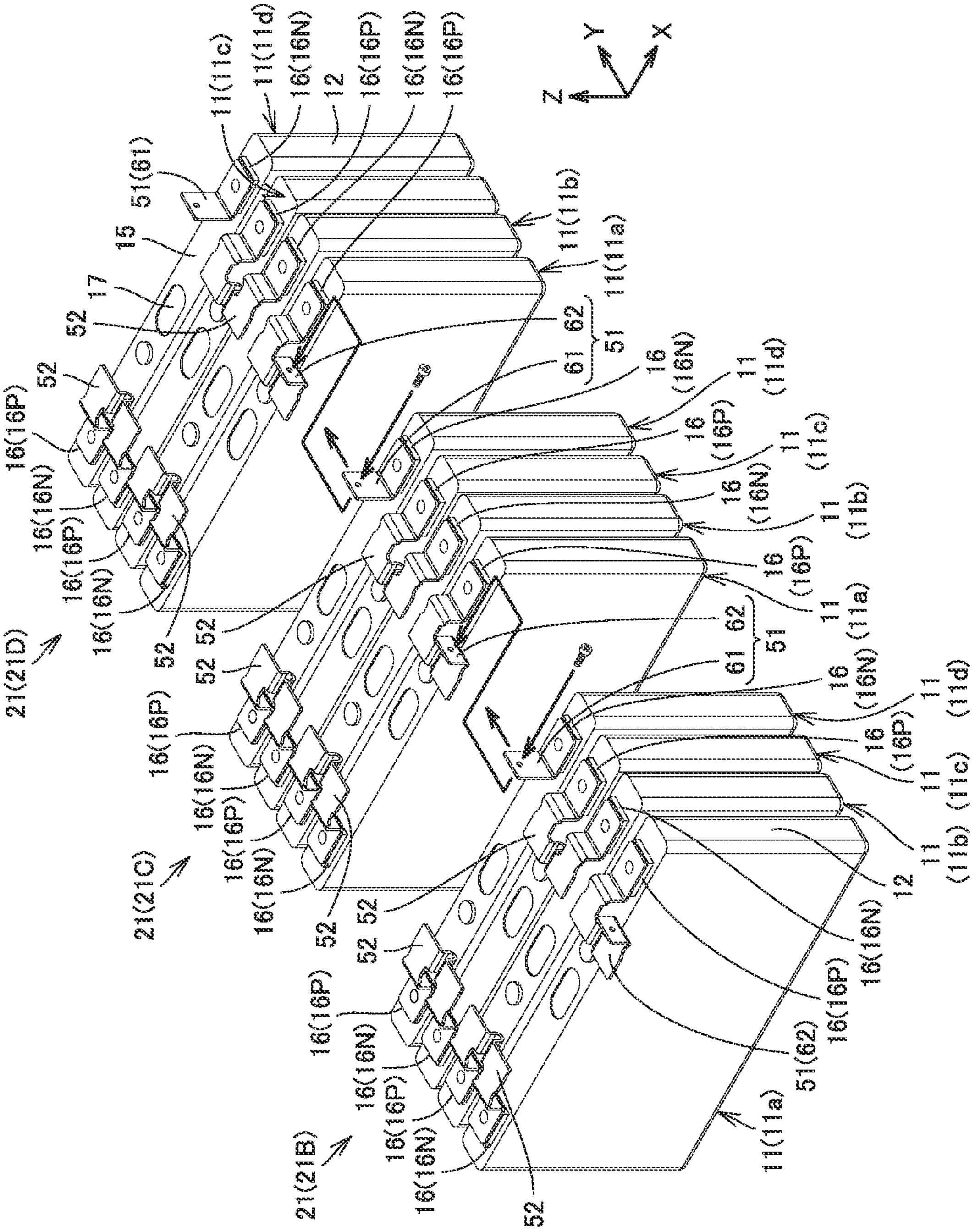
FIG. 5 is an exploded assembly diagram showing a connection structure for a plurality of battery cells.

FIG. 4 is a perspective view showing a battery cell included in the battery cell unit in FIG. 3. FIG. 5 is an exploded assembly diagram showing a connection structure for a plurality of battery cells.

Referring to FIGS. 4 and 5, battery cell 11 is a lithium ion battery. Battery cell 11 has an output density of 8000 W/L or more. Battery cell 11 has a prismatic shape and has a thin plate shape in the form of a rectangular parallelepiped. The plurality of battery cells 11 are stacked such that the Y axis direction corresponds to the thickness direction of each battery cell 11.

Each of battery cells 11 has an exterior package 12. Exterior package 12 is constituted of a housing having a rectangular parallelepiped shape, and forms the external appearance of battery cell 11. An electrode assembly and an electrolyte solution are accommodated in exterior package 12.

Exterior package 12 has a first side surface 13, a second side surface 14, and a third side surface 15. Each of first side surface 13 and second side surface 14 is constituted of a flat surface orthogonal to the Y axis direction. First side surface 13 and second side surface 14 are oriented oppositely in the Y axis direction. Each of first side surface 13 and second side surface 14 has the largest area among the areas of the plurality of side surfaces of exterior package 12. Each of first side surface 13 and second side surface 14 has a rectangular shape when viewed in the Y axis direction. Each of first side surface 13 and second side surface 14 has a rectangular shape in which the X axis direction corresponds to the long-side direction and the Z axis direction corresponds to the short-side direction when viewed in the Y axis direction. Third side surface 15 is constituted of a flat surface orthogonal to the Z axis direction. Third side surface 15 is oriented in the +Z axis direction.

Battery cell 11 further includes a gas-discharge valve 17. Gas-discharge valve 17 is provided in third side surface 15. When internal pressure of exterior package 12 becomes more than or equal to a predetermined value due to gas generated inside exterior package 12, gas-discharge valve 17 discharges the gas to the outside of exterior package 12. The gas from gas-discharge valve 17 flows through exhaust duct 93 in FIG. 1 and is discharged to the outside of battery module 100.

Battery cell 11 further has electrode terminals 16 including a pair of a positive electrode terminal 16P and a negative electrode terminal 16N. Each of electrode terminals 16 is composed of a metal. Electrode terminal 16 is provided on third side surface 15. Positive electrode terminal 16P and negative electrode terminal 16N are provided to be separated from each other in the X axis direction. Positive electrode terminal 16P and negative electrode terminal 16N are provided beside wiring member 92 and exhaust duct 93 in the X axis direction.

The plurality of battery cells 11 are stacked such that first side surfaces 13 of battery cells 11 adjacent to each other in the Y axis direction face each other and second side surfaces 14 of battery cells 11 adjacent to each other in the Y axis direction face each other. Thus, positive electrode terminals 16P and negative electrode terminals 16N are alternately arranged in the Y axis direction in which the plurality of battery cells 11 are stacked.

It should be noted that when an odd number of battery cells 11 are included in battery cell unit 21, the posture of battery cell unit 21 may be turned by 180° with respect to the Z axis between battery cell units 21 adjacent to each other in the Y axis direction.

Next, a connection structure for the plurality of battery cells 11 will be described. Referring to FIGS. 1 to 5, battery module 100 further has the plurality of bus bars 50. Each of bus bars 50 is composed of an electric conductor. The plurality of bus bars 50 are provided to electrically connect the plurality of battery cells 11 of battery module 100 together.

Each of bus bars 50 extends in the Y axis direction. Bus bar 50 has ends that both extend in the Y axis direction and that are connected to battery cells 11, 11 adjacent to each other in the Y axis direction. Bus bar 50 is provided between battery cells 11, 11 adjacent to each other in the Y axis direction so as to connect positive electrode terminal 16P and negative electrode terminal 16N arranged side by side in the Y axis direction. The plurality of battery cells 11 are electrically connected together in series by the plurality of bus bars 50.

Figure 6:
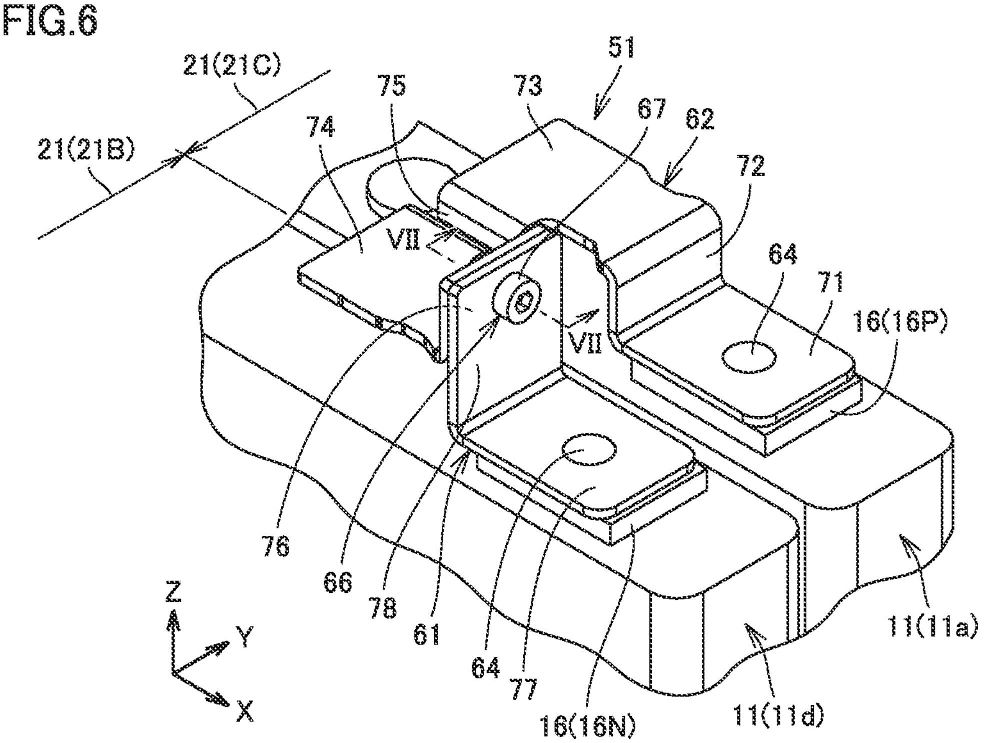
FIG. 6 is a perspective view showing a connection structure for battery cells between adjacent battery cell units.
Figure 7:
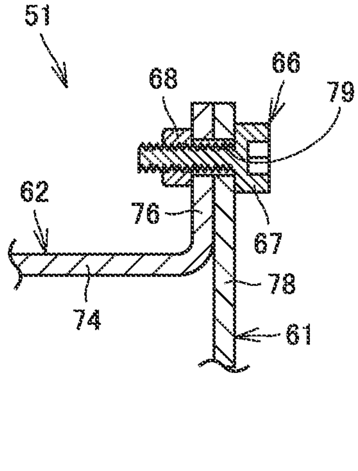
FIG. 7 is a cross sectional view showing the connection structure for the battery cells along a line VII-VII in FIG. 6.
Figure 8:
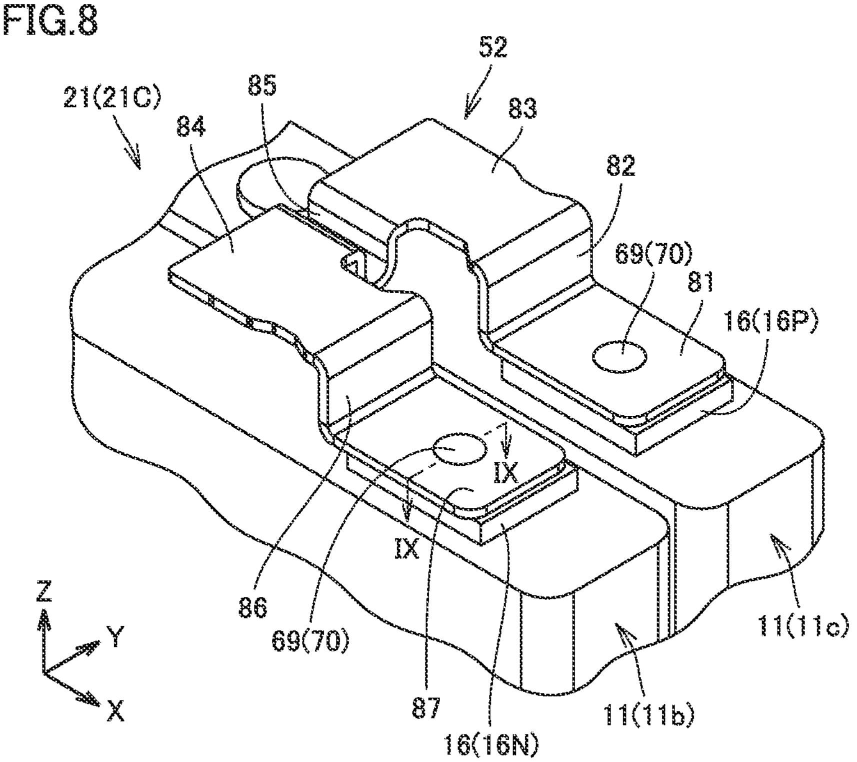
FIG. 8 is a perspective view showing a connection structure for battery cells in a battery cell unit.
Figure 9:
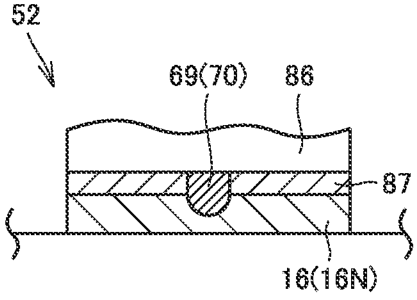
FIG. 9 is a cross sectional view showing a connection structure for battery cells when viewed in a direction along a line IX-IX in FIG. 8.

FIG. 6 is a perspective view showing a connection structure for battery cells between adjacent battery cell units. FIG. 7 is a cross sectional view showing the connection structure for the battery cells along a line VII-VII in FIG. 6. FIG. 8 is a perspective view showing a connection structure for battery cells in a battery cell unit. FIG. 9 is a cross sectional view showing the connection structure for the battery cells when viewed in a direction along a line IX-IX in FIG. 8.

Referring to FIGS. 5 to 9, the plurality of bus bars 50 include a plurality of first bus bars 51 and a plurality of second bus bars 52.

As shown in FIGS. 5 to 7, first bus bar 51 has a first joining portion 66. First joining portion 66 joins separated members to each other through a first joining form. First bus bar 51 connects, via first joining portion 66, between battery cells 11, 11 adjacent to each other in the Y axis direction.

First bus bar 51 electrically connects between battery cells 11, 11 adjacent to each other in the Y axis direction between a first battery cell unit of the plurality of battery cell units 21 and a second battery cell unit of the plurality of battery cell units 21, the second battery cell unit being adjacent to the first battery cell unit in the Y axis direction. For explanation in a range shown in FIG. 6, battery cell unit 21B corresponds to the first battery cell unit, and battery cell unit 21C corresponds to the second battery cell unit. Between battery cell units 21B, 21C, first bus bar 51 connects negative electrode terminal 16N of battery cell 11*d* in battery cell unit 21B to positive electrode terminal 16P of battery cell 11*a* in battery cell unit 21C.

As shown in FIGS. 5, 8, and 9, second bus bar 52 has a second joining portion 69. Second joining portion 69 joins separated members to each other through a second joining form different from the first joining form. Second bus bar 52 connects, via second joining portion 69, between battery cells 11, 11 adjacent to each other in the Y axis direction.

In each battery cell unit 21, second bus bar 52 electrically connects between battery cells 11, 11 adjacent to each other in the Y axis direction. For explanation in a range shown in FIG. 8, second bus bar 52 connects negative electrode terminal 16N of battery cell 11*b* to positive electrode terminal 16P of battery cell 11*c* in battery cell unit 21C.

The following describes a more specific structure of first bus bar 51 while focusing on the range shown in FIG. 6. As shown in FIGS. 6 and 7, first bus bar 51 has an asymmetrical shape with respect to an X-Z-axes plane that constitutes a boundary between battery cell 11*d* in battery cell unit 21B and battery cell 11*a* in battery cell unit 21C.

First bus bar 51 has a first bus-bar-divided body 61 and a second bus-bar-divided body 62. First bus-bar-divided body 61 and second bus-bar-divided body 62 are composed of electric conductors (metal plates) separated from each other. First bus-bar-divided body 61 is connected to negative electrode terminal 16N of battery cell 11*d* in battery cell unit 21B. Second bus-bar-divided body 62 is connected to positive electrode terminal 16P of battery cell 11*a* in battery cell unit 21C. First bus-bar-divided body 61 and second bus-bar-divided body 62 are joined to each other by first joining portion 66.

First bus-bar-divided body 61 is provided at a position overlapping with battery cell 11*d* in battery cell unit 21B when viewed in the Z axis direction. First bus-bar-divided body 61 has a first plate portion 77 and a second plate portion 78.

First plate portion 77 has a plate shape having a thickness direction corresponding to the Z axis direction, and is disposed in parallel with an X-Y-axes plane. First plate portion 77 is placed on negative electrode terminal 16N of battery cell 11*d* in battery cell unit 21B in the Z axis direction. First plate portion 77 is joined to negative electrode terminal 16N of battery cell 11*d* in battery cell unit 21B by a welded portion 64. Second plate portion 78 has a plate shape having a thickness direction corresponding to the X axis direction, and is disposed in parallel with a Y-Z-axes plane. Second plate portion 78 extends in the +Z axis direction from the end portion of first plate portion 77 in the −X axis direction.

When viewed in the Z axis direction, second bus-bar-divided body 62 is provided over a position overlapping with battery cell 11*a* in battery cell unit 21C and a position overlapping with battery cell 11*d* in battery cell unit 21B. Second bus-bar-divided body 62 has a third plate portion 71, a fourth plate portion 72, a fifth plate portion 73, a sixth plate portion 74, an elastic portion 75, and a seventh plate portion 76.

Third plate portion 71 has a plate shape having a thickness direction corresponding to the Z axis direction, and is disposed in parallel with the X-Y-axes plane. Third plate portion 71 is placed on positive electrode terminal 16P of battery cell 11*a* in battery cell unit 21C in the Z axis direction. Third plate portion 71 is joined to positive electrode terminal 16P of battery cell 11*a* in battery cell unit 21C by a welded portion 64. Fourth plate portion 72 has a plate shape having a thickness direction corresponding to the X axis direction, and is disposed in parallel with the Y-Z-axes plane. Fourth plate portion 72 extends in the +Z axis direction from the end portion of third plate portion 71 in the −X axis direction.

Each of fifth plate portion 73 and sixth plate portion 74 has a plate shape having a thickness direction corresponding to the Z axis direction, and is disposed in parallel with the X-Y-axes plane. Fifth plate portion 73 extends in the −X axis direction from the end portion of fourth plate portion 72 in the +Z axis direction. Sixth plate portion 74 is provided at a position displaced from fifth plate portion 73 in the −Y axis direction. Fifth plate portion 73 is provided at a position overlapping with battery cell 11*a* in battery cell unit 21C when viewed in the Z axis direction, and sixth plate portion 74 is provided at a position overlapping with battery cell 11*d* in battery cell unit 21B when viewed in the Z axis direction.

Elastic portion 75 extends between fifth plate portion 73 and sixth plate portion 74. When viewed in the Z axis direction, elastic portion 75 is provided at a position overlapping with a boundary between battery cell 11*a* in battery cell unit 21C and battery cell 11*d* in battery cell unit 21B. Elastic portion 75 extends in the −Z axis direction from the end portion of fifth plate portion 73 in the −Y axis direction, is curved to reverse in the Z axis direction, and further extends in the +Z axis direction so as to be contiguous to the end portion of sixth plate portion 74 in the +Y axis direction. Elastic portion 75 can be elastically deformed to change a distance between fifth plate portion 73 and sixth plate portion 74 in the Y axis direction.

Seventh plate portion 76 has a plate shape having a thickness direction corresponding to the X axis direction, and is disposed in parallel with the Y-Z-axes plane. Seventh plate portion 76 extends in the +Z axis direction from an end portion of sixth plate portion 74 in the +X axis direction. Seventh plate portion 76 is placed on second plate portion 78 in the X axis direction. Seventh plate portion 76 is in surface contact with second plate portion 78 in a plane parallel to the Y-Z-axes plane.

First joining portion 66 joins second plate portion 78 of first bus-bar-divided body 61 and seventh plate portion 76 of second bus-bar-divided body 62 to each other through fixation with a bolt, which serves as the first joining form.

The fixation with a bolt as the first joining form is means allowing for attaching and detaching between first bus-bar-divided body 61 and second bus-bar-divided body 62, which are targets for joining.

First joining portion 66 has a bolt 67 and a nut 68. Respective bolt holes 79 are formed in first bus-bar-divided body 61 (second plate portion 78) and second bus-bar-divided body 62 (seventh plate portion 76). Bolt holes 79 are constituted of through holes respectively extending through second plate portion 78 and seventh plate portion 76 in the X axis direction. Bolt 67 is inserted into bolt holes 79 and nut 68 is screwed into a threaded portion of bolt 67, with the result that second plate portion 78 of first bus-bar-divided body 61 and seventh plate portion 76 of second bus-bar-divided body 62 are fastened to each other.

A direction in which first bus-bar-divided body 61 (second plate portion 78) and second bus-bar-divided body 62 (seventh plate portion 76) are joined to each other is the X axis direction orthogonal to the Y axis direction in which the plurality of battery cells 11 are stacked.

Next, the following describes a more specific structure of second bus bar 52 while focusing on the range shown in FIG. 8. As shown in FIGS. 8 and 9, second bus bar 52 has a symmetrical shape with respect to the X-Z-axes plane that constitutes a boundary between battery cell 11*b* in battery cell unit 21C and battery cell 11*c* in battery cell unit 21C.

Second bus bar 52 is composed of an electric conductor (metal plate) in one piece. When viewed in the Z axis direction, second bus bar 52 is provided over a position overlapping with battery cell 11*b* in battery cell unit 21C and a position overlapping with battery cell 11*c* in battery cell unit 21C. Second bus bar 52 is joined to each of negative electrode terminal 16N of battery cell 11*b* and positive electrode terminal 16P of battery cell 11*c* by second joining portion 69.

Second bus bar 52 has a first plate portion 81, a second plate portion 82, a third plate portion 83, a fourth plate portion 84, an elastic portion 85, a fifth plate portion 86, and a sixth plate portion 87.

First plate portion 81, second plate portion 82, third plate portion 83, fourth plate portion 84, and elastic portion 85 have shapes respectively corresponding to third plate portion 71, fourth plate portion 72, fifth plate portion 73, sixth plate portion 74, and elastic portion 75 in second bus-bar-divided body 62 of first bus bar 51. First plate portion 81 is placed on positive electrode terminal 16P of battery cell 11*c* in battery cell unit 21C in the Z axis direction. First plate portion 81 is in surface contact with positive electrode terminal 16P of battery cell 11*c* in battery cell unit 21C in a plane parallel to the X-Y-axes plane.

Sixth plate portion 87 has a plate shape having a thickness direction corresponding to the Z axis direction, and is disposed in parallel with the X-Y-axes plane. Sixth plate portion 87 is placed on negative electrode terminal 16N of battery cell 11*b* in battery cell unit 21C in the Z axis direction. Sixth plate portion 87 is in surface contact with negative electrode terminal 16N of battery cell 11*b* in battery cell unit 21C in a plane parallel to the X-Y-axes plane. Fifth plate portion 86 has a plate shape having a thickness direction corresponding to the X axis direction, and is disposed in parallel with the Y-Z-axes plane. Fifth plate portion 86 extends in the +Z axis direction from the end portion of sixth plate portion 87 in the −X axis direction and is contiguous to the end portion of fourth plate portion 84 in the +X axis direction.

First plate portion 81 and positive electrode terminal 16P of battery cell 11*c* are composed of electric conductors (metal plates) separated from each other Sixth plate portion 87 and negative electrode terminal 16N of battery cell 11*b* are composed of electric conductors (metal plates) separated from each other. Second joining portion 69 joins first plate portion 81 to positive electrode terminal 16P of battery cell 11*c*, and joins sixth plate portion 87 to negative electrode terminal 16N of battery cell 11*b* through welding, which serves as the second joining form.

The welding as the second joining form is means not allowing for attaching and detaching between second bus bar 52 and electrode terminal 16, which are targets for joining.

Second joining portion 69 has a welded portion 70. Welded portion 70 is formed by joining second bus bar 52 and electrode terminal 16 to each other through welding such as laser welding. Welded portion 70 is a portion formed in the following manner: at the time of welding, second bus bar 52 and electrode terminal 16 are melted and are then solidified into one piece with each other. Welded portion 70 extends through second bus bar 52 in the Z axis direction and has a bottom portion inside electrode terminal 16.

It should be noted that the shape of welded portion 70 is not particularly limited, and for example, welded portion 70 may be provided to extend in the form of a line when viewed in the Z axis direction, or may be provided at a plurality of positions separated from each other. Further, the second joining form used for second joining portion 69 is not limited to welding, and may be fixation with a rivet, for example.

For a battery module, there has been a demand to adjust the number of battery cells included in the battery module in accordance with a manner of use or required performance of the battery module. There has been also a demand to detach a specific battery cell from the battery module or replace a battery cell at the time of maintenance of the battery module. Further, when all the connections among the plurality of battery cells by bus bars are made through welding, a large-sized welding machine that handles the maximum number of battery cells needs to be prepared as a battery module manufacturing facility, and a battery cell cannot be readily attached or detached at the time of maintenance of the battery module, disadvantageously.

To address this, in battery module 100 of the present embodiment, at second bus bar 52 that connects between battery cells 11, 11 in battery cell unit 21, welding is used to join second bus bar 52 and battery cell 11 to each other by second joining portion 69, whereas at first bus bar 51 that connects between respective battery cells 11, 11 of battery cell units 21, 21 arranged side by side in the Y axis direction, fixation with a bolt is used to join first bus-bar-divided body 61 and second bus-bar-divided body 62 to each other by first joining portion 66.

According to such a configuration, by an operation of fastening bolt 67 at first joining portion 66, first bus-bar-divided body 61 and second bus-bar-divided body 62 are joined to each other so as to connect battery cell units 21, 21 arranged side by side in the Y axis direction, whereas by an operation of loosening bolt 67 at first joining portion 66, first bus-bar-divided body 61 and second bus-bar-divided body 62 are disjoined from each other so as to disconnect battery cell units 21, 21 arranged side by side in the Y axis direction. Thus, the connecting and disconnecting between battery cell units 21, 21 arranged side by side in the Y axis direction can be performed by such simple operations, so that the number of battery cells 11 included in battery module 100 can be readily adjusted by increasing or decreasing the number of battery cell units 21. Further, the operation of attaching or detaching a specific battery cell unit 21 to or from battery module 100 can be readily performed for the same reason, thus resulting in improved maintainability of battery module 100.

As shown in FIG. 3, at the time of manufacturing battery module 100, the plurality of battery cell units 21 are first assembled.

In this step, welding is used to connect first bus-bar-divided body 61 to negative electrode terminal 16N of battery cell 11*d* disposed at the end portion in the +Y axis direction. By the welding, each second bus bar 52 is connected to positive electrode terminal 16P and negative electrode terminal 16N of battery cells 11, 11 arranged side by side in the Y axis direction. By the welding, second bus-bar-divided body 62 is connected to positive electrode terminal 16P of battery cell 11*a* disposed at the end portion in the −Y axis direction.

Next, as shown in FIG. 1, the plurality of battery cell units 21 arranged side by side in the Y axis direction are collectively held by restraint member 41, and first bus-bar-divided body 61 and second bus-bar-divided body 62 are fastened to each other using bolt 67 between battery cell units 21 adjacent to each other in the Y axis direction.

In this case, the size of the welding machine for connecting bus bars 50 to battery cells 11 is determined by the number of battery cells 11 included in battery cell units 21, rather than the number of battery cells 11 (battery cell units 21) included in battery module 100. Therefore, it is not necessary to prepare a large-sized welding machine, with the result that a facility for manufacturing battery module 100 can be constructed readily and inexpensively.

As shown in FIGS. 6 to 9, the body size of second bus bar 52 is smaller than the body size of first bus bar 51 for which the fixation with a bolt is used to join first bus-bar-divided body 61 and second bus-bar-divided body 62 to each other by first joining portion 66. According to such a configuration, a wide space can be secured around second bus bar 52 just above battery cell unit 21.

Further, the electric resistance of second bus bar 52 is smaller than the electric resistance of first bus bar 51 for which the fixation with a bolt is used to join first bus-bar-divided body 61 and second bus-bar-divided body 62 to each other by first joining portion 66. According to such a configuration, energy loss in second bus bar 52 can be suppressed to be low.

Figure 10:
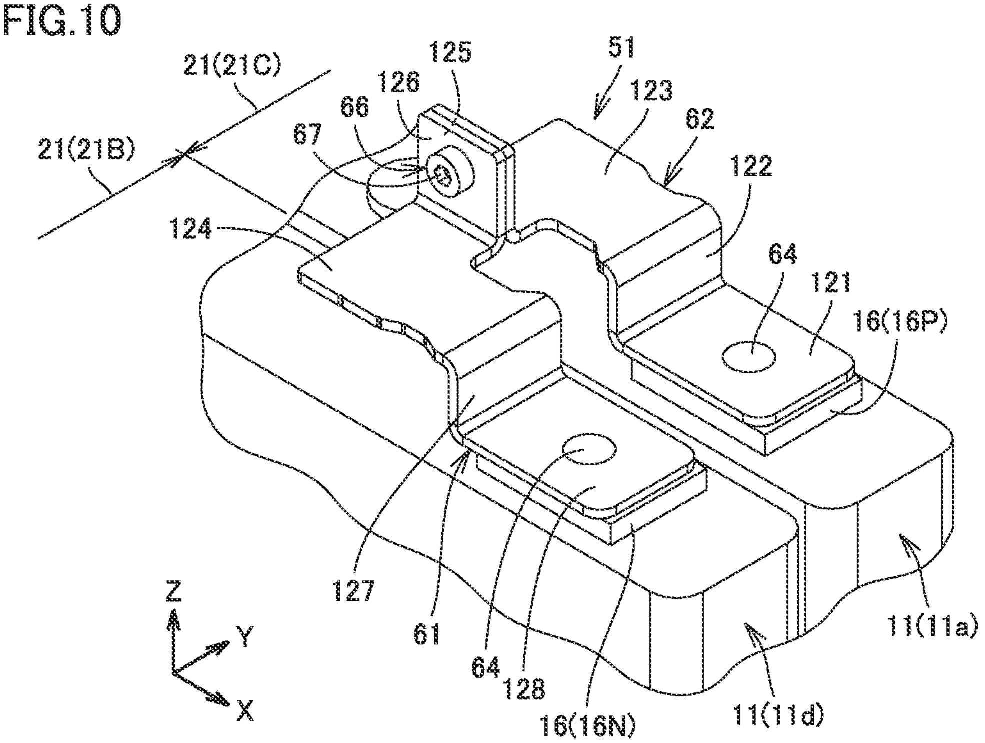
FIG. 10 is a perspective view showing a modification of a first bus bar shown in FIG. 6.

FIG. 10 is a perspective view showing a modification of the first bus bar shown in FIG. 6. Referring to FIG. 10, first bus bar 51 in the present modification has a symmetrical shape with respect to the X-Z-axes plane that constitutes a boundary between battery cell 11*d* in battery cell unit 21B and battery cell 11*a* in battery cell unit 21C.

Second bus-bar-divided body 62 is provided at a position overlapping with battery cell 11*a* in battery cell unit 21C when viewed in the Z axis direction. Second bus-bar-divided body 62 has a first plate portion 121, a second plate portion 122, a third plate portion 123, and a fourth plate portion 125.

First plate portion 121, second plate portion 122, and third plate portion 123 have shapes respectively corresponding to first plate portion 81, second plate portion 82, and third plate portion 83 in FIG. 8. Fourth plate portion 125 has a plate shape having a thickness direction corresponding to the Y axis direction, and is disposed in parallel with the X-Z-axes plane. Fourth plate portion 125 extends in the +Z axis direction from the end portion of third plate portion 123 in the −Y axis direction.

First bus-bar-divided body 61 is provided at a position overlapping with battery cell 11*d* in battery cell unit 21B when viewed in the Z axis direction. First bus-bar-divided body 61 has a fifth plate portion 128, a sixth plate portion 127, a seventh plate portion 124, and an eighth plate portion 126.

Fifth plate portion 128, sixth plate portion 127, seventh plate portion 124, and eighth plate portion 126 respectively have shapes symmetrical to first plate portion 121, second plate portion 122, third plate portion 123, and fourth plate portion 125 with respect to the X-Z-axes plane that constitutes the boundary between battery cell 11*d* in battery cell unit 21B and battery cell 11*a* in battery cell unit 21C.

Fourth plate portion 125 and eighth plate portion 126 overlap with each other in the Y axis direction. Fourth plate portion 125 and eighth plate portion 126 are provided at positions overlapping the boundary between battery cell 11*d* in battery cell unit 21B and battery cell 11*a* in battery cell unit 21C when viewed in the Z axis direction. Fourth plate portion 125 and eighth plate portion 126 are in surface contact with each other in a plane parallel to the X-Z-axes plane.

First joining portion 66 joins eighth plate portion 126 of first bus-bar-divided body 61 and fourth plate portion 125 of second bus-bar-divided body 62 to each other by fixation with a bolt, which serves as the first joining form. A direction in which first bus-bar-divided body 61 (eighth plate portion 126) and second bus-bar-divided body 62 (fourth plate portion 125) are joined to each other is parallel to the Y axis direction in which the plurality of battery cells 11 are stacked.

It should be noted that the shape of first bus bar 51 is not particularly limited. For example, in first bus bar 51 in FIG. 10, eighth plate portion 126 may be directly connected to fifth plate portion 128 not via sixth plate portion 127 and seventh plate portion 124, and fourth plate portion 125 may be directly connected to first plate portion 121 not via second plate portion 122 and third plate portion 123.

Figure 11:
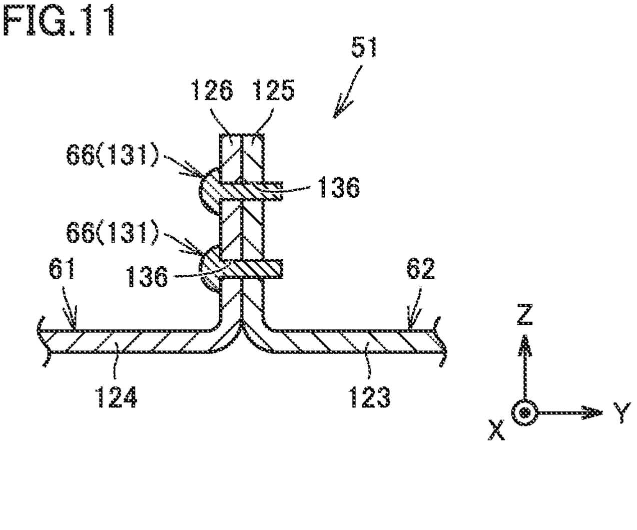
FIG. 11 is a diagram showing a first modification of a first joining form at a first joining portion shown in FIG. 10.
Figure 12:
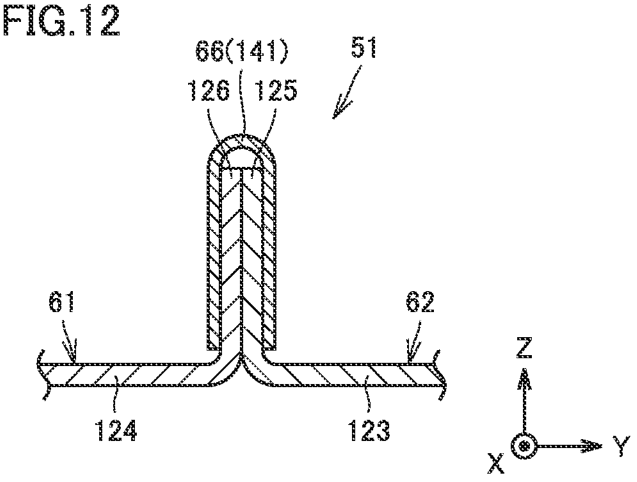
FIG. 12 is a diagram showing a second modification of the first joining form at the first joining portion shown in FIG. 10.
Figure 13:
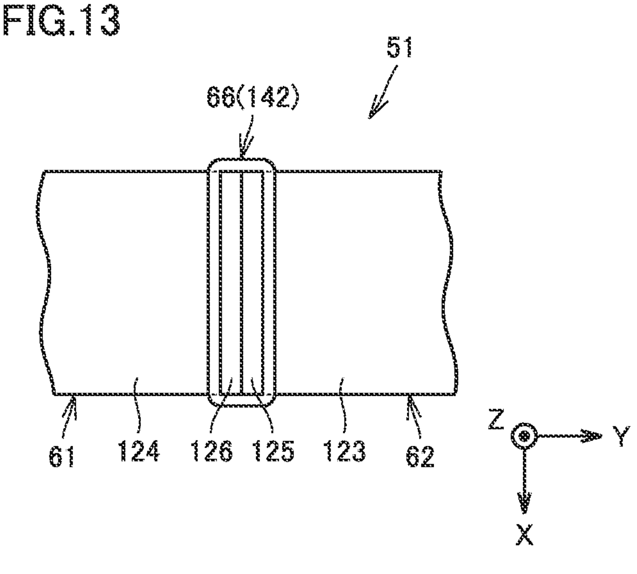
FIG. 13 is a diagram showing a third modification of the first joining form at the first joining portion shown in FIG. 10.

FIGS. 11 to 13 are diagrams showing modifications of the first joining form at the first joining portion shown in FIG. 10.

Referring to FIG. 11, in the present modification, first joining portion 66 joins first bus-bar-divided body 61 (eighth plate portion 126) and second bus-bar-divided body 62

(fourth plate portion 125) to each other by fixation with a pin, which serves as the first joining form.

First joining portion 66 has a pin 131. First bus-bar-divided body 61 (eighth plate portion 126) and second bus-bar-divided body 62 (fourth plate portion 125) are provided with pin holes 136. Pin holes 136 are constituted of through holes respectively extending through eighth plate portion 126 and fourth plate portion 125 in the Y axis direction. Pin 131 is press-fitted into pin holes 136.

Referring to FIG. 12, in the present modification, first joining portion 66 joins first bus-bar-divided body 61 (eighth plate portion 126) and second bus-bar-divided body 62 (fourth plate portion 125) to each other by fixation with a clip, which serves as the first joining form. First joining portion 66 has a clip 141. Clip 141 sandwiches eighth plate portion 126 and fourth plate portion 125 in the Y axis direction.

Referring to FIG. 13, in the present modification, first joining portion 66 joins first bus-bar-divided body 61 (eighth plate portion 126) and second bus-bar-divided body 62 (fourth plate portion 125) to each other by fixation with a band, which serves as the first joining form. First joining portion 66 has a band 142. Band 142 is provided to surround eighth plate portion 126 and fourth plate portion 125 in a plane parallel to the X-Y-axes plane.

Each of the fixations with pin, clip and band as the first joining form described in the modifications shown in FIGS. 11 to 13 is means allowing for attaching and detaching between first bus-bar-divided body 61 and second bus-bar-divided body 62, which are targets for joining.

Figure 14:
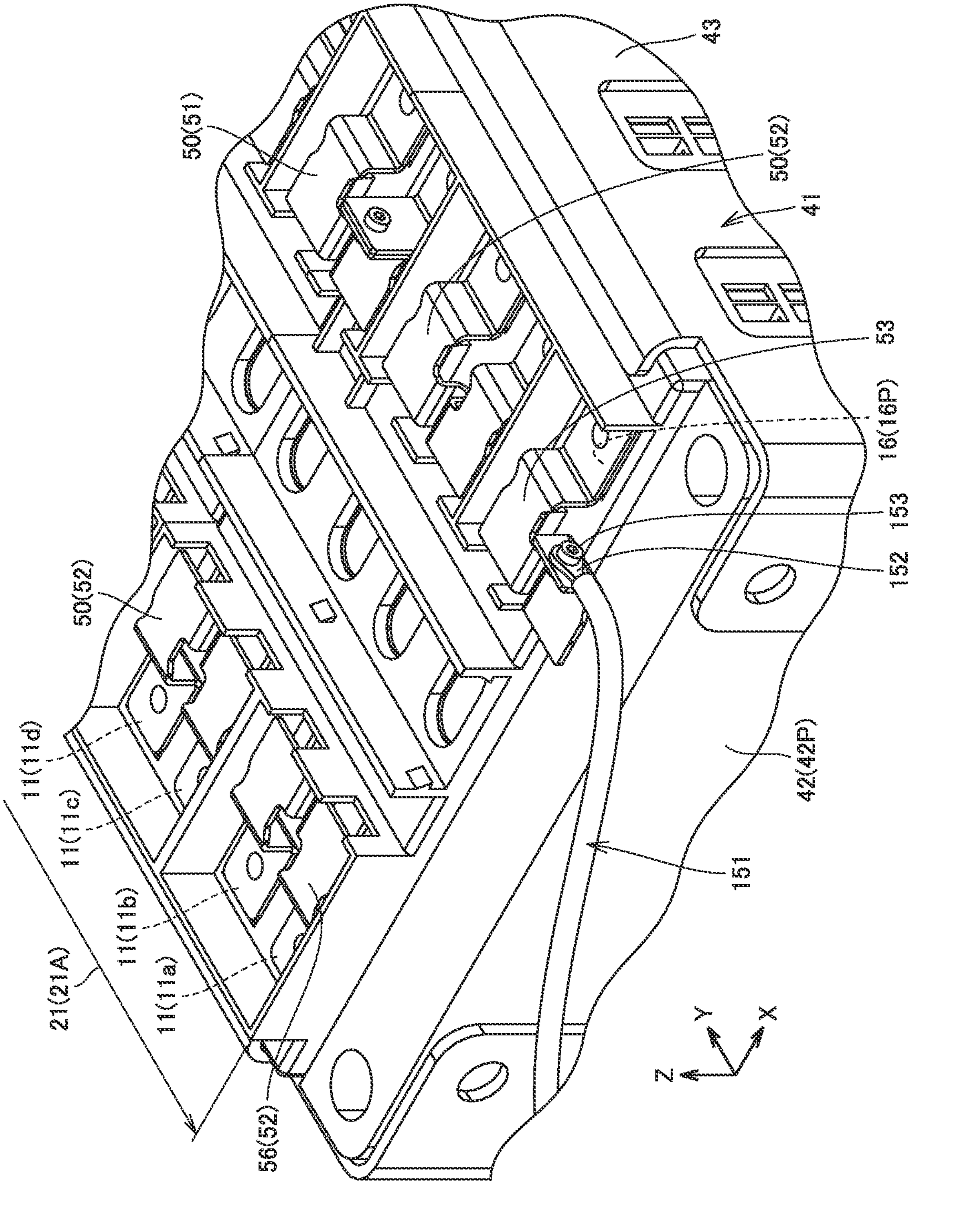
FIG. 14 is a perspective view showing a modification of the battery module in FIG. 1.

FIG. 14 is a perspective view showing a modification of the battery module in FIG. 1. Referring to FIG. 14, end plate 42P faces, in the Y axis direction, battery cell unit 21A (third battery cell unit) of the plurality of battery cell units 21. Battery cell 21*a* of battery cell unit 21A is disposed adjacent to end plate 42P in the Y axis direction.

The battery module according to the present modification further has a third bus bar 53. Third bus bar 53 is provided at battery cell 21*a* in battery cell unit 21A. Third bus bar 53 is connected to electrode terminal 16 (positive electrode terminal 16P) of battery cell 21*a* in battery cell unit 21A. Third bus bar 53 has the same shape as that of second bus-bar-divided body 62 of first bus bar 51 shown in FIG. 6.

According to such a configuration, bolt hole 79 shown in FIG. 7 is formed in third bus bar 53 having the same shape as that of second bus-bar-divided body 62 of first bus bar 51. Therefore, a bolt 153 can be used to connect third bus bar 53 to a terminal 152 of a cable 151 serving as an external wiring. Thus, collective terminal 91 can be omitted, thereby reducing the number of components of the battery module.

It should be noted that since third bus bar 53 having the same shape as that of first bus-bar-divided body 61 of first bus bar 51 is provided in battery cell 11*d* of battery cell unit 21F facing end plate 41Q in FIG. 1, cable 151 can be directly fixed to third bus bar 53 with a bolt.

The above-described structure of battery module 100 according to the embodiment of the present invention is summarized as follows: battery module 100 according to the present embodiment includes: the plurality of battery cells 11 stacked in the Y axis direction serving as the predetermined direction; restraint member 41 that applies, to the plurality of battery cells 11, restraint force along the Y axis direction; and the plurality of bus bars 50 that electrically connect the plurality of battery cells 11 together, the plurality of bus bars 50 including first bus bar 51 and second bus bar 52. First bus bar 51 has first joining portion 66 that joins separated members to each other through the first joining form, and connects, via first joining portion 66, between battery cells 11 adjacent to each other in the Y axis direction. Second bus bar 52 has second joining portion 69 that joins separated members to each other through the second joining form different from the first joining form, and connects, via second joining portion 69, between battery cells 11 adjacent to each other in the Y axis direction.

According to battery module 100 of the embodiment of the present invention thus configured, there can be realized battery module 100 in which the number of battery cells 11 can be readily adjusted by such a configuration that bus bars 50 that electrically connect the plurality of battery cells 11 together includes first bus bar 51 and second bus bar 52 for which the first joining form and the second joining form, which are different from each other, are respectively used.

Although the embodiments of the present invention have been described and illustrated in detail, it is clearly understood that the same is by way of illustration and example only and is not to be taken by way of limitation, the scope of the present invention being interpreted by the terms of the appended claims. The scope of the present invention is defined by the terms of the claims, and is intended to include any modifications within the scope and meaning equivalent to the terms of the claims.

What is claimed is:

1. A battery module comprising:

a plurality of battery cells stacked in a predetermined direction, each of the battery cells having an external terminal;

a restraint member that applies, to the plurality of battery cells, a restraint force along the predetermined direction; and a plurality of bus bars that electrically connect the plurality of battery cells together, the plurality of bus bars including a first bus bar and a second bus bar, wherein the first bus bar has a first joining portion that joins divided members of the first bus bar to each other through a first joining form, and connects, via the first joining portion, between battery cells adjacent to each other in the predetermined direction, and the second bus bar has a second joining portion that joins the second bus bar and the external terminal of adjacent battery cells to each other through a second joining form different from the first joining form, and connects, via the second joining portion, between battery cells adjacent to each other in the predetermined direction, the second joining form is welding, and the first joining form is fixation with a bolt, pin, clip or band, the battery module comprising a plurality of battery cell units arranged side by side in the predetermined direction with the restraint force applied to the plurality of battery cell units along the predetermined direction by the restraint member, each of the battery cell units includes the plurality of the battery cells arranged side by side continuously in the predetermined direction, and a holding member that collectively holds the battery cells in each battery cell unit arranged side by side continuously in the predetermined direction, the first bus bar electrically connects between the battery cells adjacent to each other in the predetermined direction between a first battery cell unit of the plurality of battery cell units and a second battery cell unit of the plurality of battery cell units, the second battery cell unit being adjacent to the first battery cell unit in the predetermined direction, the second bus bar electrically connects between the battery cells that are adjacent to each other in the predetermined direction in each of the battery cell units, the battery cells in each of the battery cell units are collectively held by the holding member, the holding member includes a case body in which the plurality of battery cells are accommodated, the case body has a rectangular parallelepiped shape, and a plurality of the case bodies are arranged side by side in the predetermined direction.

2. The battery module according to claim 1, wherein electric resistance of the first bus bar and electric resistance of the second bus bar are different from each other.

3. The battery module according to claim 1, wherein a body size of the first bus bar and a body size of the second bus bar are different from each other.

4. The battery module according to claim 1, wherein the first bus bar has a first bus-bar-divided body and a second bus-bar-divided body joined to each other by the first joining portion, and the restraint member has an end plate facing, in the predetermined direction, a third battery cell unit of the plurality of battery cell units, the third battery unit being disposed at an end portion in the predetermined direction, the battery module further comprising a third bus bar provided in the third battery cell unit at a battery cell disposed adjacent to the end plate in the predetermined direction, wherein the third bus bar has the same shape as a shape of one of the first bus-bar- divided body and the second bus-bar-divided body, and is able to be joined to an external terminal using the first joining form.

5. The battery module according to claim 1, wherein each of the battery cells has an output density of 8000 W/L or more.

6. The battery module according to claim 1, wherein the plurality of battery cells are electrically connected together in series by the plurality of bus bars.

7. The battery module according to claim 1, wherein the case body in which the plurality of battery cells are accommodated has a plurality of ventilation ports.

* * * * *